United States Patent [19]

Foggini

[11] Patent Number: 4,617,834
[45] Date of Patent: Oct. 21, 1986

[54] PREFORMED INTEGRAL COATING, PARTICULARLY FOR MOTORVEHICLE GEAR SHIFT LEVERS

[76] Inventor: Giovanni Foggini, Corso Matteotti, 23, Torino, Italy

[21] Appl. No.: 703,163

[22] Filed: Feb. 19, 1985

Related U.S. Application Data

[63] Continuation of Ser. No. 360,040, Mar. 19, 1982, abandoned.

[30] Foreign Application Priority Data

Apr. 1, 1981 [IT] Italy .............................. 53070/81[U]

[51] Int. Cl.$^4$ ...................... G05G 1/06; B60K 20/00
[52] U.S. Cl. ........................................ 74/523; 74/543
[58] Field of Search ...................... 74/523, 543, 473 P, 74/473 R, 18.1, 18, 566

[56] References Cited

U.S. PATENT DOCUMENTS

| | | | |
|---|---|---|---|
| 2,121,989 | 6/1938 | Schnase et al. | 74/543 |
| 3,561,281 | 2/1971 | Wilfert | 74/543 |
| 3,701,333 | 10/1972 | Schwerdhoefer | 74/523 |
| 3,795,156 | 3/1974 | Nuescheler | 74/523 |
| 3,918,316 | 11/1975 | Reinhold et al. | 74/523 |

Primary Examiner—Gary L. Smith
Assistant Examiner—Vinh Luong
Attorney, Agent, or Firm—Guido Modiano; Albert Josif

[57] ABSTRACT

The coating comprises a center sheath enclosing the lever and terminated at one end with a knob grip which includes a lever end check seat, and at the other end with a bellows seal formed with a groove adapted to cooperate with a mating check seat provided on the console.

1 Claim, 8 Drawing Figures

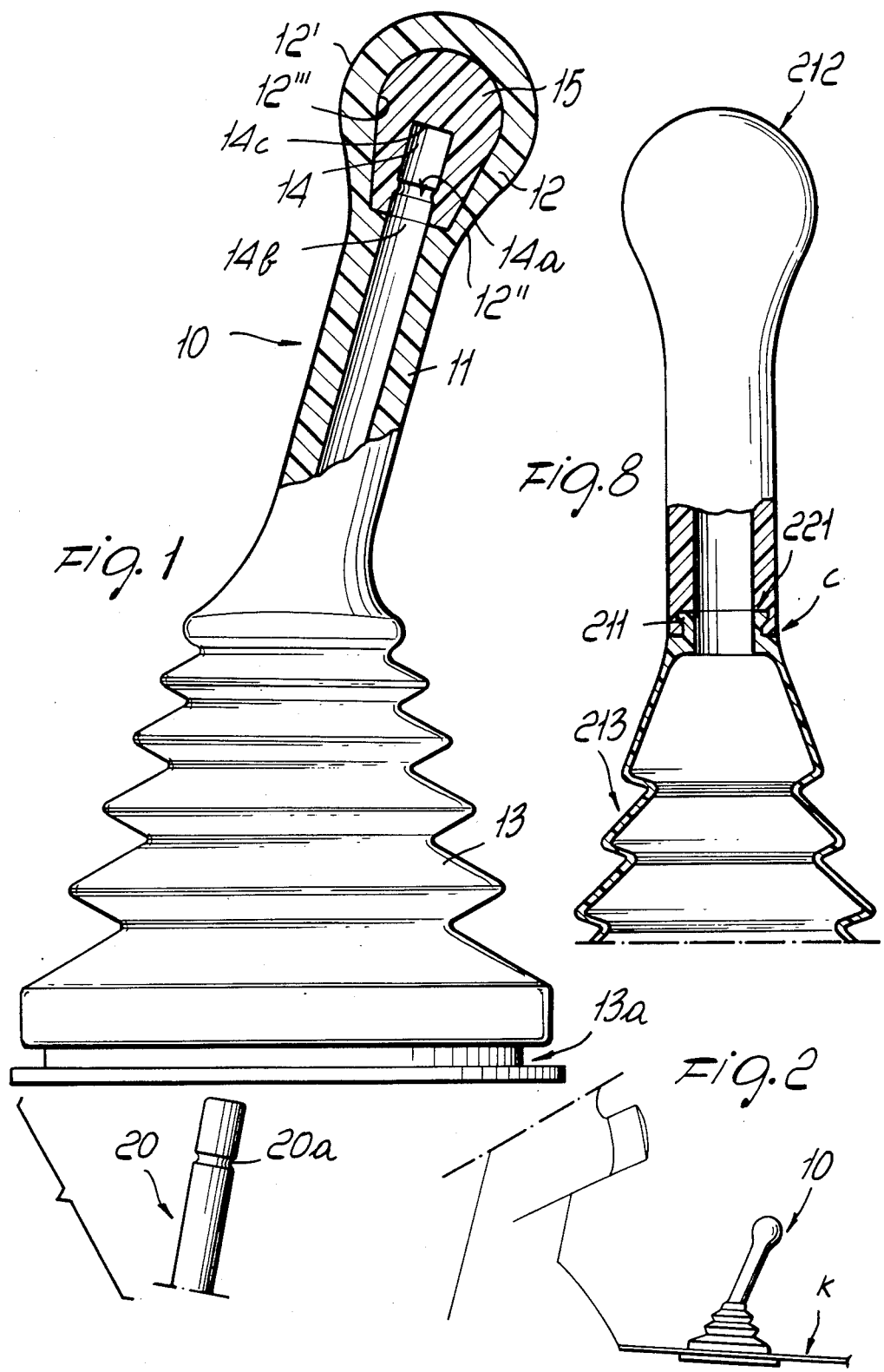

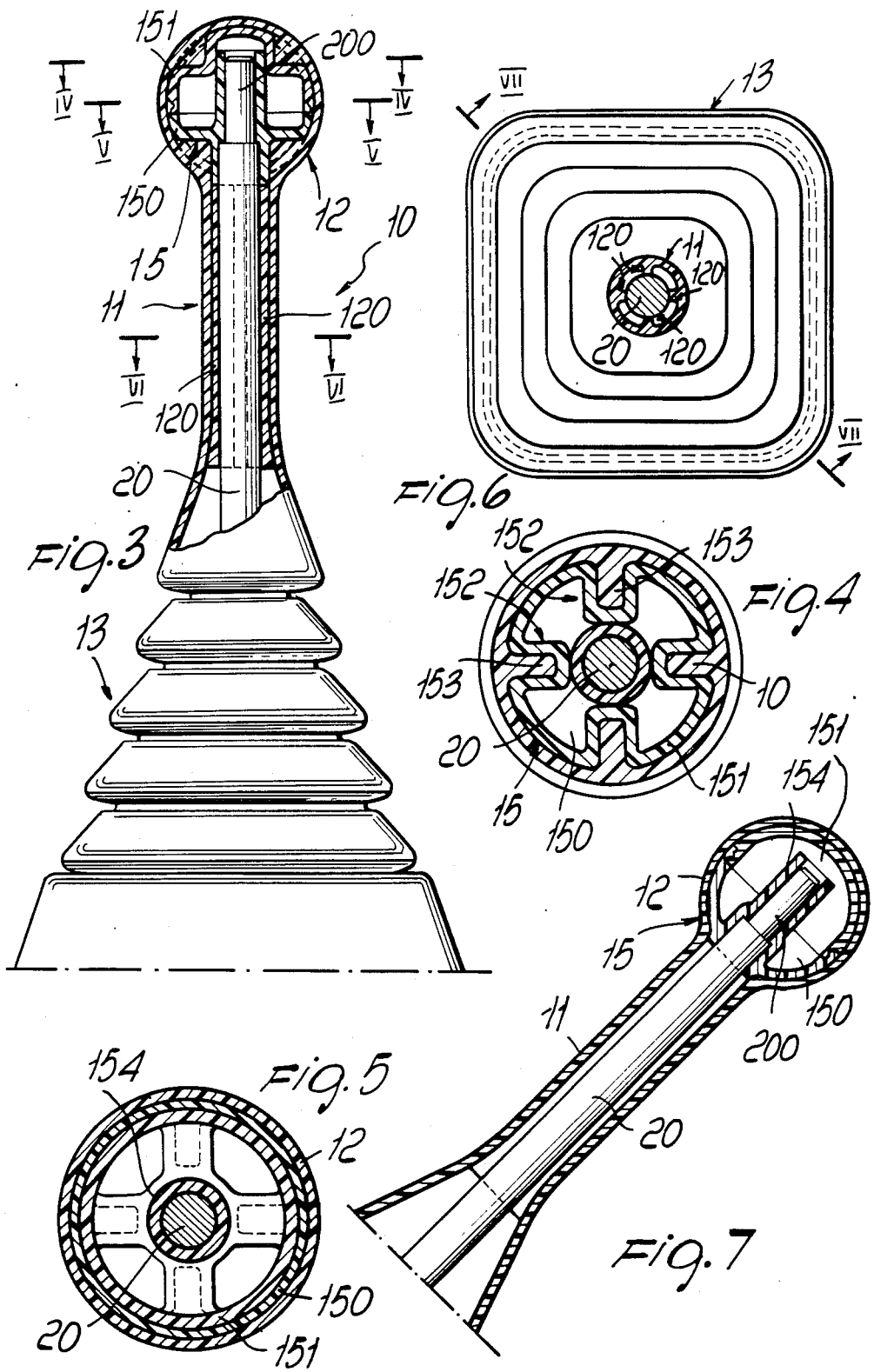

PREFORMED INTEGRAL COATING, PARTICULARLY FOR MOTORVEHICLE GEAR SHIFT LEVERS

This is a continuation of application Ser. No. 06/360,040, filed Mar. 19, 1982 and now abandoned.

BACKGROUND OF THE INVENTION

This invention relates to a coating or covering particularly intended for motorvehicle gear shift levers.

Currently used gear shift levers comprise a metal rod projecting from a central cabinet on the car floor, commonly termed "console", and are provided with a knob grip, as well as with a bellows seal arranged to protect the lever swivel joint at said console. The knob, which may have various configurations and sizes, is threaded onto or snap engaged with the rod end; the bellows seal is fitted over the rod and generally jointed or clamped to the console base. This prior arrangement of parts is scarcely effective as regards the bellows capability to prevent dust and moisture penetration, and is inconvenient when the bellows seal itself is to be replaced.

SUMMARY OF THE INVENTION

Accordingly the task of the invention is that of obviating the aforesaid deficiencies, while improving the aesthetic appearance of the gear shift lever assembly. According to one aspect of the invention, this task is achieved by a preformed integral or undivided coating, particularly for motorvehicle gear shift levers, characterized in that it incorporates the lever knob grip and lever protective bellows seal for the lever articulation joint.

Advantageously, the coating is of a polymeric material, and comprises a central sleeve enclosing the lever rod and terminating, without continuity breaks, at one end in a knob, including a force-fit check seat for the rob end, and, at the other end, in a bellows seal formed with a groove adapted to cooperate with a mating check seat provided on the console.

BRIEF DESCRIPTION OF THE DRAWINGS

The invention will be more clearly understood by making reference to the detailed description which follows, in conjunction with the accompanying illustrative, and not limitative, drawings, where:

FIG. 1 is a partly sectional elevation view of the integral coating according to one embodiment of the invention and of the upper portion of the gear shift lever rod in an exploded view;

FIG. 2 is a diagramatic view showing the coating installed;

FIG. 3 is a partly sectional elevation view of the coating or covering, according to a modified embodiment of this invention;

FIG. 4 is a cross-sectional view taken along the line IV—IV of FIG. 3;

FIG. 5 is a cross-sectional view taken along the line V—V of FIG. 3;

FIG. 6 is a further cross-sectional view, taken along the line VI—VI of FIG. 3;

FIG. 7 is a sectional view taken along the line VII—VII of FIG. 6; and

FIG. 8 is an elevation, partly sectional, view of a further modified embodiment of the invention.

DESCRIPTION OF THE PREFERRED EMBODIMENTS

Making reference initially to FIGS. 1 and 2, the reference numeral 10 generally designates the sheath-like coating or covering structure of this invention, and 20 the end of the metal rod constituting the gear shift lever of a passenger car.

In accordance with this invention, the sheath-like structure comprises a one piece coating or covering 10, advantageously formed from a polymeric material such as soft PVC, comprises a central sleeve portion 11 which is terminated, as a one-piece construction and without continuity breaks, at one end in a knob grip defining upper portion 12 formation 12 generally of bell-like shape, and at the other end in a lower bellows seal portion 13 for protecting the lever articulation joint or connection.

The knob formation 12 has a rounded top 12' and a downwardly frustoconically converging mantle formation 12". A hollow seat 12 '" is provoded within the knob formation 12, the hollow seat 12'" having a shape corresponding to the generally bell-like shape of the knob formation 12. As visible from the drawing, the axial extension of the hollow seat 12'" is greater than any transverse extension thereof. A core member 15 of hard polymeric material is embedded and countershaped to said hollow seat 12'". A cylindrical retaining cavity 14 is provided in said core member 15 and is adapted to accommodate the end 20 of the rod in force-fit relationship. The cavity 14 has a diameter corresponding to the diameter of the rod end 20 and is defined by a groove extending in the said core member 15, preferably made of a hard polymeric material embedded in the knob 12 by a co-molding process, and is provided with an internally protruding concentric annular ridge or O-ring 14a adapted to engage, by elastic deformation of its material, in a corresponding groove 20a on the rod end 20, the ridge 14a having a diameter smaller than the diameter of the cylindrical cavity 14.

As visible from the drawing, the O-ring 14a is formed by an annular inwards protruding portion of the check seat defining groove, whereas said annular portion presents an inner diameter smaller that the diameter of the left-over portion of the groove in cross-section. It will be noted from the drawing that the cylindrical cavity 14 has an open end 14b at a zone where the sleeve portion 11 departs from thhe frustoconically converging mantle and an opposite dead end 14c at a section where the rounded top 12' passes into the frustoconically downwardly converging mantle 12".

The bellows seal 13, preferably in the shape of a truncated pyramid or cone, is in turn provided with an annular groove 13a adapted to be engaged by the edge of a corresponding opening provided in the console K, wherefrom there extends the gear shift lever.

Said annular groove 13a extends in proximity of the lower edge of the bellows portion and has a diameter smaller than the diameter, in cross-section, of the bellows regions extending directly above and under it. As visible from FIG. 1, the upper portion and the sleeve portion define a longitudinal axis different from the central, asymmetry axis defined by the frusto-conical shape of the bellows portion.

The coating or covering can be easily assembled by fitting it over the rod and pushing axially on the knob to produce the force-fit engagement of the rod end in the seat 14, as specified hereinabove. Then, the groove 13a of the bellows seal is engaged with the edge of the opening provided in the console K, as clearly shown in FIG. 2. The coating continuity ensures a perfectly tight seal, impervious to dust and moisture, while imparting the shift lever a pleasing aesthetic appearance.

In the modified embodiment shown in FIGS. 3 to 7, the insert 15 comprises a hollow element formed by two juxtaposed half-shells 150-151 of a rigid polymeric material. Such half-shells define a spherical profile solid with recessed radial lobes 152 in cruciform relationship, which delimit corresponding outer depressions 153 wherein the material of the coating 10 (FIG. 4) spreads to prevent any displacement of the insert relatively to the coating. The bottom half-shell 150 carries an axial tube 154 which, at the upper portion thereof, is surrounded, for checking and stiffening purposes, by the radial lobes 152 of the top half-shell 151. In the tube 154, there is force-fitted the depressed end 200 of the rod 20 which is urged to abut against the end of the tube. Again for lightening reasons, as well as to facilitate the fitting of the coating or covering over the lever 20, the sheath portion 11 of the coating has a bore of significantly larger diameter than the rod 20, and is provided with axial ribs 120, separated by respective lightening voids, which ribs lay adjacent the lever with the coating fitted in place.

In the embodiment of FIG. 8, the coating or covering is formed by two portions 212-213, advantageously (but not limitatively) formed both from a polymeric material, and respectively including the protective bellows seal for the swivel joint and the knob grip of the lever.

The two portions, which would be molded separately, are detachably interconnected at C by means of a fastener which ensures an apparent surface continuity to form, upon completion of the connection, an integral coating sleeve.

Preferably, the detachable fastener is implemented by providing on either of the two portions a collar 211 having an undercut toric profile, and on the other portion a mating seat 221; the collar and seat snap engaging together by virtue of the inherent elasticity of the material.

This coating or covering may be assembled either by separately fitting the two portions 212-213 over the lever and then interconnecting them, or by fitting the coating as a whole after connecting the two portions together.

I claim:

1. Pre-formed sheath-like structure, particularly for motor vehicle gear shift levers of the type having a hand actuated rod member with a rod diameter and a rod member axis, said sheath-like structure comprising a one piece coating member portion of soft polymeric material and a core member portion of hard polymeric material, said one piece coating member protion having an axis coinciding in use with said rod member axis, an upper portion defining a knob grip formation of generally bell-like shape coaxial with said rod member axis and having a rounded top and downwardly frustoconically converging mantle formation and a hollow seat therein, said seat having a shape corresponding to said bell-like shape and being coaxial therewith, the axial extension of said seat being greater than any transverse extension thereof, said one piece coating member portion having further an intermediate sleeve portion departing from said converging mantle formation, as an integral undivided part thereof, said intermediate sleeve portion having a constant thickness and defining internally a cylindrical hollow space having a diameter corresponding to the diameter of said gear shift lever rod member, a lower bellows-like portion departing from said intermediate sleeve portion as an integral undivided part thereof, said bellows-like portion having a wall thickness smaller than said constant thickness of said intermediate sleve portion and a downwardly diverging frustoconical shape, said bellows-like portion having further an annular lower groove formation concentric therewith in proximity of a lower edge of said bellows-like portion and for engagement in use with an edge of an opening of a console of the motor vehicle, said core member portion of hard polymeric material being embedded in said hollow seat and countershaped to said seat and structurally in co-molded relationship with said one piece coating member portion thereby to strengthen the connection between said core member portion of hard polymeric material and said one piece coating member portion of soft polymeric material, said core member portion having a cylindrical cavity coaxial with said one piece coating member portion axis, said cavity having a diameter corresponding to said rod member diameter and an axial extension substantially greater than said rod diameter, said cylindrical cavity having an open end at a zone where said intermediate sleeve portion departs from said frustoconically converging mantle and an opposite dead end at a section where said rounded top passes into said frustoconically converging mantle, said cylindrical cavity having further an inwardly protruding concentrically arranged annular ridge having a diameter smaller than the diameter of said cylindrical cavity, said cylindrical cavity being coaxial with said cylindrical hollow space, thereby said cylindrical cavity and said cylindrical hollow space constituting a continuation of each other for receiving therein in use said rod member in fitting engagement therewith, said annular ridge being arranged to be received in a fitting relationship therewith into a circumferential groove provided near a free end of said rod member.

* * * * *